(12) United States Patent
Roiu et al.

(10) Patent No.: US 10,850,724 B2
(45) Date of Patent: Dec. 1, 2020

(54) MANAGEMENT OF THE OPERATION OF AN AUTOMOTIVE DUAL BATTERY ELECTRICAL SYSTEM WITH KINETIC ENERGY RECOVERY DURING BRAKING

(71) Applicant: C.R.F. SOCIETA' CONSORTILE PER AZIONI, Orbassano (IT)

(72) Inventors: Daniel Roiu, Orbassano (IT); Alfredo Primon, Orbassano (IT)

(73) Assignee: C.R.F. SOCIETA' CONSORTILE PER AZIONI, Orbassano (IT)

(*) Notice: Subject to any disclaimer, the term of this patent is extended or adjusted under 35 U.S.C. 154(b) by 173 days.

(21) Appl. No.: 16/235,260

(22) Filed: Dec. 28, 2018

(65) Prior Publication Data
US 2019/0256076 A1    Aug. 22, 2019

(30) Foreign Application Priority Data
Feb. 19, 2018    (IT) .................. 102018000002823

(51) Int. Cl.
*B60W 20/00*    (2016.01)
*B60K 6/26*    (2007.10)
(Continued)

(52) U.S. Cl.
CPC ............... *B60W 20/00* (2013.01); *B60K 6/26* (2013.01); *B60K 6/28* (2013.01); *B60K 6/48* (2013.01);
(Continued)

(58) Field of Classification Search
None
See application file for complete search history.

(56) References Cited

U.S. PATENT DOCUMENTS 7,740,092 B2 * 6/2010 Bender .............. B60W 10/08
180/65.29
9,399,456 B2 * 7/2016 Hung ................ B60L 58/21
(Continued)

FOREIGN PATENT DOCUMENTS

EP    2390982 A1    11/2011
EP    2595278 A1    5/2013
(Continued)

OTHER PUBLICATIONS

Italian Search Report for Italiam Application No. IT201800002823, completed Oct. 17, 2018.

*Primary Examiner* — Nicholas K Wiltey
(74) *Attorney, Agent, or Firm* — Harness, Dickey & Pierce, P.L.C.

(57) ABSTRACT

An automotive electronic control unit is configured to: determine the current operation status of an automotive dual battery electrical system defined by the current electric charge statuses of a main electrical energy source and of an auxiliary electrical energy source and by the current electrical energy demand of electrical loads, determine which operation area of an operation plane of the automotive dual battery electrical system the current operation status of the automotive dual battery electrical system belongs to, and control the operation of the automotive dual battery electrical system, and enable or disable the implementation of one or more of the functionalities of automatic start and stop of the internal combustion engine, of regenerative braking and of electric charging depending on the operation area which the current operation status of the automotive dual battery electrical system belongs to.

6 Claims, 3 Drawing Sheets

(51) Int. Cl.
*B60K 6/28* (2007.10)
*B60K 6/485* (2007.10)
*B60L 7/10* (2006.01)
*B60R 16/033* (2006.01)
*B60L 15/20* (2006.01)
*B60L 58/20* (2019.01)
*B60K 6/48* (2007.10)
*B60L 50/16* (2019.01)
*B60W 20/10* (2016.01)
*B60W 20/40* (2016.01)
*B60L 58/12* (2019.01)

(52) U.S. Cl.
CPC ............... *B60K 6/485* (2013.01); *B60L 7/10* (2013.01); *B60L 15/2045* (2013.01); *B60L 50/16* (2019.02); *B60L 58/12* (2019.02); *B60L 58/20* (2019.02); *B60R 16/033* (2013.01); *B60W 20/10* (2013.01); *B60W 20/40* (2013.01); *B60K 2006/268* (2013.01); *B60L 2260/26* (2013.01); *B60W 2510/244* (2013.01); *B60Y 2200/92* (2013.01); *B60Y 2300/18125* (2013.01); *B60Y 2300/192* (2013.01)

(56) References Cited

U.S. PATENT DOCUMENTS

| | | | | |
|---|---|---|---|---|
| 2002/0174798 | A1* | 11/2002 | Kumar | B60L 50/30 105/50 |
| 2009/0243387 | A1* | 10/2009 | Conen | F02N 11/0866 307/10.1 |
| 2010/0054010 | A1* | 3/2010 | Darroman | B60L 1/00 363/131 |
| 2012/0010041 | A1* | 1/2012 | Soliman | B60W 20/15 477/5 |
| 2012/0262105 | A1* | 10/2012 | Atkins | B60K 6/105 320/103 |
| 2014/0067183 | A1* | 3/2014 | Sisk | B60L 50/40 701/22 |
| 2014/0183939 | A1* | 7/2014 | Jiang | H01M 10/482 307/9.1 |
| 2015/0032301 | A1* | 1/2015 | Lamba | B60L 58/21 701/19 |
| 2016/0229403 | A1* | 8/2016 | Khafagy | B60W 10/06 |
| 2017/0001624 | A1* | 1/2017 | Wang | B60W 10/06 |
| 2017/0120773 | A1* | 5/2017 | Zhang | H01M 10/0525 |
| 2018/0257634 | A1* | 9/2018 | Zhao | B60K 6/36 |
| 2018/0372200 | A1* | 12/2018 | Kumar | B60K 6/36 |
| 2019/0296561 | A1* | 9/2019 | Le | H02J 7/00047 |

FOREIGN PATENT DOCUMENTS

| | | |
|---|---|---|
| EP | 2638614 A1 | 9/2013 |
| EP | 3028336 A1 | 6/2016 |
| WO | WO-2014/025069 A1 | 2/2014 |
| WO | WO-2015016965 A1 | 2/2015 |

* cited by examiner

| | | | MB | | |
|---|---|---|---|---|---|
| | | | 85 - 100% | 80 - 85% | <80% |
| AB | 50% - 90% | 0 - 20A | SWMB open<br>SWAB closed<br>BSG: EPA & RB<br>S&S ON | SWMB closed<br>SWAB closed<br>BSG: RB<br>S&S ON | SWMB closed<br>SWAB open<br>BSG: Alternator<br>S&S OFF |
| | | 20 -50A | SWMB open<br>SWAB closed<br>BSG: EPA & RB<br>S&S ON | SWMB closed<br>SWAB closed<br>BSG: RB<br>S&S ON | SWMB closed<br>SWAB open<br>BSG: Alternator<br>S&S OFF |
| | | 50 -100A | SWMB open<br>SWAB closed<br>BSG: EPA & RB<br>S&S ON | SWMB closed<br>SWAB closed<br>BSG: RB<br>S&S ON | SWMB closed<br>SWAB open<br>BSG: Alternator<br>S&S OFF |
| | 30 - 50% | 0 - 20A | SWMB open<br>SWAB closed<br>BSG: EPA & RB<br>S&S ON | SWMB closed<br>SWAB closed<br>BSG: RB<br>S&S ON | SWMB closed<br>SWAB open<br>BSG: Alternator<br>S&S OFF |
| | | 20 -50A | SWMB open<br>SWAB closed<br>BSG: EPA & RB<br>S&S ON | SWMB closed<br>SWAB closed<br>BSG: RB<br>S&S ON | SWMB closed<br>SWAB open<br>BSG: Alternator<br>S&S OFF |
| | | 50 -100A | SWMB closed<br>SWAB closed<br>BSG: RB<br>S&S ON | SWMB closed<br>SWAB closed<br>BSG: RB<br>S&S ON | SWMB closed<br>SWAB open<br>BSG: Alternator<br>S&S OFF |
| | < 30% | 0 - 20A | SWMB open<br>SWAB closed<br>BSG: RB<br>S&S OFF | SWMB closed<br>SWAB closed<br>BSG: RB<br>S&S OFF | SWMB closed<br>SWAB open<br>BSG: Alternator<br>S&S OFF |
| | | 20 -50A | SWMB open<br>SWAB closed<br>BSG: RB<br>S&S OFF | SWMB closed<br>SWAB closed<br>BSG: RB<br>S&S OFF | SWMB closed<br>SWAB open<br>BSG: Alternator<br>S&S OFF |
| | | 50 -100A | SWMB closed<br>SWAB open<br>BSG: Alternator<br>S&S OFF | SWMB closed<br>SWAB open<br>BSG: Alternator<br>S&S OFF | SWMB closed<br>SWAB open<br>BSG: Alternator<br>S&S OFF |

Fig. 3

MANAGEMENT OF THE OPERATION OF AN AUTOMOTIVE DUAL BATTERY ELECTRICAL SYSTEM WITH KINETIC ENERGY RECOVERY DURING BRAKING

CROSS-REFERENCE TO RELATED APPLICATIONS

This patent application claims priority from Italian patent application No. 102018000002823 filed on Feb. 19, 2018, the disclosure of which is incorporated herein by reference.

TECHNICAL FIELD OF THE INVENTION

The invention relates, in general, to automotive electrical systems and, in particular, to the management of the operation of automotive dual battery electrical systems with kinetic energy recovery during braking.

The invention finds application in any type of road motor vehicle, regardless of whether it is used for the transportation of people, such as a car, a bus, a camper, etc., or for the transportation of goods, such as an industrial vehicle (truck, B-train, trailer truck, etc.) or a light or medium-heavy commercial vehicle (light van, van, pick-up trucks, etc.).

STATE OF THE ART

As it is known, the increase in the number of electrically controlled/supplied automotive on-board systems led to the adoption of technologies that are capable of managing safety-critical situations caused by faults or malfunctioning of the automotive electrical systems used to supply power to the automotive on-board systems.

One of the first technologies capable of managing safety-critical situations is represented by the introduction of automotive dual battery electrical systems, in which the traditional main or service electrical battery is accompanied by an auxiliary or backup electrical battery used in case of fault of the main electrical battery and/or to supply electrical power to non-priority or non-safety-critical electrical loads, so as to lighten the burden of the main electrical battery. Depending on the use for which it is intended, the auxiliary electrical battery can have the same electrical capacity or even a different, usually more limited, capacity compared to the one of the main electrical battery and, therefore, it can be smaller and cheaper than the main electrical battery.

A first contribution to the development of this technology is described in EP 2 390 982 A1, where the Applicant suggests an architecture of an automotive dual battery electrical system and an associated operation management logic, which allow manufacturers to manage, in an energetically efficient manner, the flow of electrical energy in the automotive dual battery electrical system, so that, when the motor vehicle leaves the freewheel mode and with the engine off, there are no drops in the electrical voltage supplied to the electrically powered/controlled automotive on-board safety-critical systems, in order to ensure the supply of electrical power to the electrically powered/controlled automotive on-board safety-critical systems for the entire duration of the freewheel mode and with the engine off, also in case of fault of the main electrical battery, and in order to ensure the inertial cranking of the internal combustion engine even in case of fault of the main electrical battery.

A further contribution to the development of this technology is disclosed in EP 2 638 614 A1, where the Applicant suggests an automotive electrical system using a so-called smart electrical alternator, namely an electronically-controlled electrical alternator, whose output electrical quantities (electrical voltage and current) are adjustable in response to an electrical adjustment command consisting of an adjustment electric current, wherein the smart electrical alternator is electronically controlled so as to change the output electrical voltage based on a series of operating parameters indicating the state of electrical charge of the electrical battery, the operating state of the internal combustion engine, and the longitudinal dynamics of the motor vehicle, so as to reduce electrical frictions and, as a consequence, the resistive torque caused by the alternator on the internal combustion engine of the motor vehicle, in order to reduce the waste of energy and improve the performances of the internal combustion engine, dynamically estimate the contribution of the electrical loads supplied by the alternator on the internal combustion engine so as to more precisely control the mechanical torque generated by the internal combustion engine, increase the average life of the electrical battery, and reduce fuel consumption and the polluting emissions of the internal combustion engine.

A further contribution to the development of this technology is described in EP 2 595 278 A1, where the Applicant suggests an automotive electrical system using a renewable electrical power source in the form of one or more solar panels and a smart electrical alternator, which is electronically controlled so as adjust the operating point of the solar panels in order to cause them to work in maximum efficiency operating points, in which they deliver the maximum electrical power.

WO 2014/025069 A1 discloses a power supply system for a motor vehicle comprising an electrical generator, a first battery and a second battery, which are connected to the electrical generator, and an electrical switch, which is arranged along a connection line electrically connecting the first and the second battery and electrically connects and disconnects the first battery and the electrical generator to/from the second battery. The power supply system carries out the regenerative generation of the generator when the motor vehicle decelerates. A terminal voltage of the first battery is greater than the one of the second battery. The power supply system further comprises first control means, which cause the electrical switch to switch to an electrically connected state in order to apply an electric charge both to the first and to the second battery during the regenerative generation of the generator, discharge monitoring means to monitor the state of discharge of the first battery during the regenerative generation, and second control means to disconnect the electrical switch based on the state of discharge of the first battery.

Finally, WO 2015/016965 A1 discloses an automotive 12-volt battery system comprising a first battery, which is directly coupled to an electrical system and has a first battery chemistry, and a second battery, which is coupled in parallel to the first battery, is directly coupled to the electrical system and has a second battery chemistry with a higher coulombic efficiency than the first battery chemistry. The first battery and the second battery have different voltages, so that the voltage range of the second battery is higher than the voltage range of the second battery. The first battery directs the electrical power generated during the regenerative braking to the second battery using the inner resistance of the first battery so as to allow the second battery to capture the greatest part of the electrical energy generated during the regenerative braking, and the second battery supplies power to the electrical system due to the higher voltage range of the second battery when the second battery has a positive state of charge.

SUBJECT-MATTER AND SUMMARY OF THE INVENTION

The Applicant found out that, despite being satisfactory in many different aspects, automotive dual battery electrical systems still have room for improvements in terms of efficiency in the management of the electrical energy flow.

The object of the invention is to provide a further contribution to the development of the technology of automotive dual battery electrical systems, which allows manufacturers to further improve the efficiency in the management of the electrical energy flow in automotive dual battery electrical systems.

Therefore, according to the invention, there is provided an automotive dual battery electrical system as claimed in the appended claims.

BRIEF DESCRIPTION OF THE DRAWINGS

FIG. 3 shows a table representing operating conditions in which the automotive dual battery electrical system operates depending on the state of electric charge of the two electrical batteries.

DESCRIPTION OF PREFERRED EMBODIMENTS OF THE INVENTION

The invention will now be described in detail with reference to the accompanying figures, so as to allow a person skilled in the art to carry it out and to use it. Possible changes to the embodiments described will be immediately evident to skilled people and the generic principles described can be applied to other embodiments and applications without for this reason going beyond the scope of protection of the invention as it is defined in the appended claims. Therefore, the invention cannot be considered as limited to the embodiments described and shown, but is has to be associated with the widest scope of protection possible in accordance with the features described and claimed herein.

Figure 1:
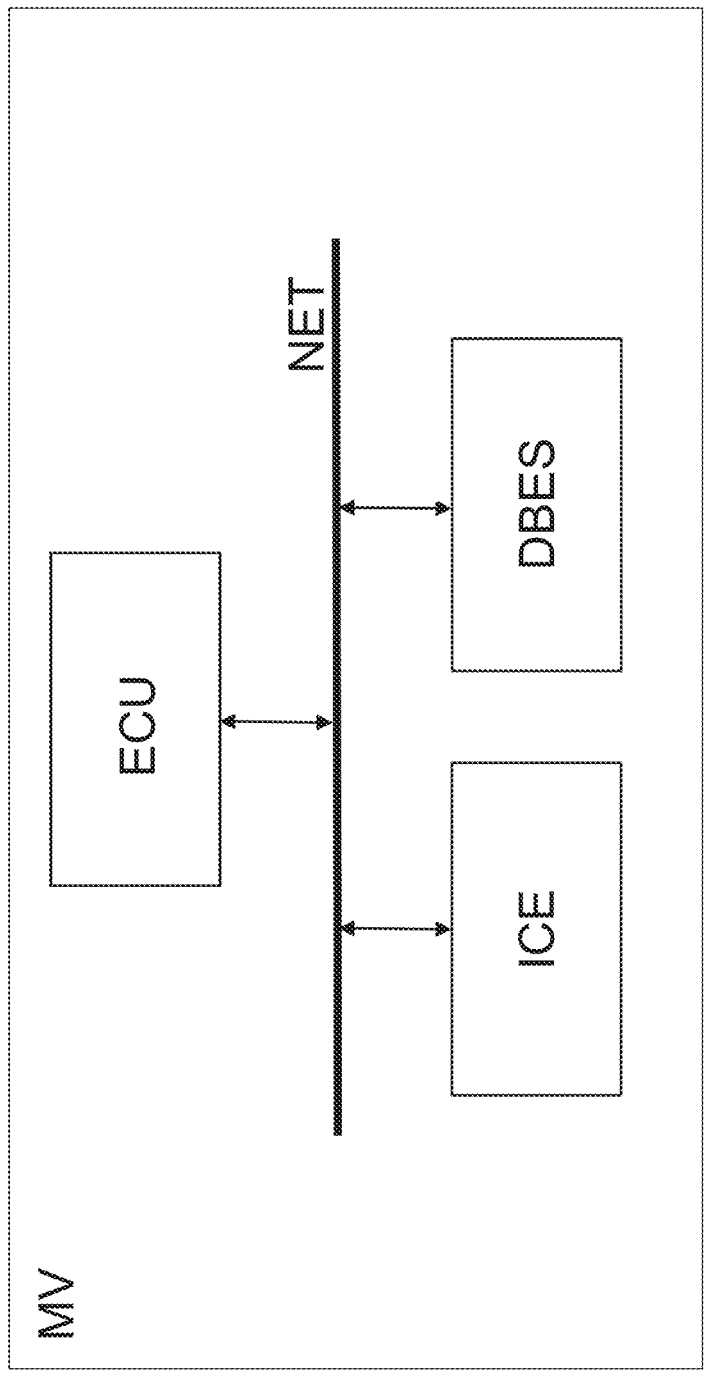
FIG. 1 shows a block diagram of automotive on-board systems.

FIG. 1 schematically shows automotive on-board systems of a motor vehicle MV involved in the implementation of the invention and comprising an internal combustion engine ICE, an automotive dual battery electrical system DBES, and an automotive electronic control unit ECU connected to the internal combustion engine ICE and to the automotive dual battery electrical system DBES through an automotive on-board communication network NET, for example a CAN network, a FlexRAy network or the like.

Figure 2:
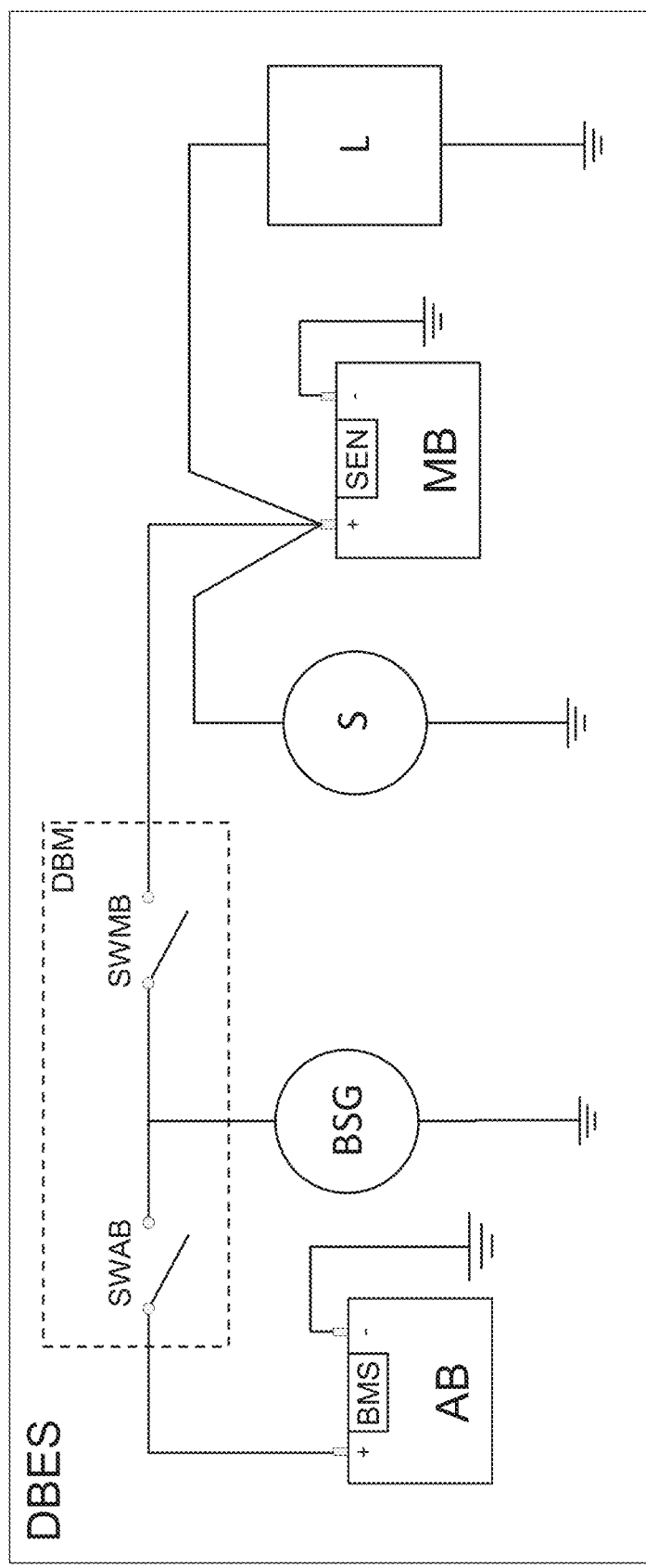
FIG. 2 shows a simplified electrical diagram of an automotive dual battery electrical system configured to implement the invention.

FIG. 2 shows a simplified electrical diagram of a preferred embodiment of the automotive dual battery electrical system DBES.

The automotive dual battery electrical system DBES comprises:

a main electrical accumulator, hereinafter referred to as main (or service) electrical batter MB, for example a 12 V lead-acid battery, a secondary electrical accumulator, hereinafter referred to as auxiliary (or buffer) electrical batter AB, for example a 12 V lithium-ion battery, a battery charge status sensor SEN associated with the main battery MB in order to monitor the voltage and the electric current thereof and determine the electric charge status thereof, a battery management system BMS associated with the auxiliary batter AB in order to monitor the voltage and the electric current thereof and determine the electric charge status thereof, a reversible alternator, more commonly known as belt-driven starter generator BSG, which is coupled to the drive shaft of the internal combustion engine ICE of the motor vehicle MV through a belt and is a reversible electric machine or motor-generator electronically controllable so as to selectively operate as an electric motor, in order to generate an additional mechanical torque to be added to the one generated by the internal combustion engine ICE, and as a traditional alternator, in order to generate electrical energy;

a starter motor S designed to carry out cold starts of the internal combustion engine of the motor vehicle MV, electrical loads L, which represent, as a whole, all the electrically supplied/controlled automotive on-board vehicles, both the safety critical ones and the safety non-critical ones, and an electronic switch, hereinafter referred to as dual battery manager DBM, connected among the main and auxiliary batteries MB and AB, belt-driven starter generator BSG and the electrical loads L in order to selectively connect the main and auxiliary batteries MB and AB, belt-driven starter generator BSG, the starter motor S and the electrical loads L to one another in the way described below.

The electronic control unit ECU is connected to the different automotive on-board systems, to the belt-driven starter generator BSG, to the starter motor S, to the dual battery manager DBM through the automotive on-board communication network NET, to the battery electric charge status sensor SEN through a local interconnection network LIN (not shown), to the battery management system BMS through a local interconnection network LIN or through the automotive on-board communication network NET, and is configured to generate control signals for the belt-driven starter generator BSG, the starter motor S and the dual battery manager DBM in order to properly control the operation thereof, as described more in detail below with reference to what concerns the invention.

The belt-driven starter generator BSG is electronically controllable by the automotive electronic control unit ECU in order to fulfil a series of functions comprising, among others:

automatic internal combustion engine stop and start S&S, in which the belt-driven starter generator BSG is operated as an electric motor to start the internal combustion engine ICE after it has been stopped by the automotive electronic control unit ECU in certain running conditions of the motor vehicle MV, electric power assist-torque boost (or motoring) EPA, in which the belt-driven starter generator BSG is operated as an electric motor to generate a mechanical torque to supplement the mechanical torque generated by the internal combustion engine ICE, regenerative braking RB, in which the belt-driven starter generator BSG is operated as an electrical generator to create a kinetic energy recovery system KERS to recover part of the kinetic energy of the motor vehicle MV during braking and turn it into electrical energy to be used to charge the main and auxiliary batteries MB and AB and/or supply power to the electrical loads L, and alternator (A), in which the belt-driven starter generator BSG is operated as a classic alternator, namely as an electrical generator to generate electrical energy.

The electronic control unit ECU could alternatively be manufactured in the form of an electronic control unit specifically dedicated to the control of the electrical system DBES and, hence, be distinct both from the electronic control unit of the drivetrain and from the electronic control unit of the internal combustion engine and communicate with them through the automotive on-board network NET, or it could be built-in, with these electronic control units, in one single electronic control unit.

The starter motor S has a first terminal connected to the positive pole of the main battery MB in a direct manner, i.e. without the interposition of other components, and also to the positive pole of the auxiliary batter AB in an indirect manner, through the dual battery manager DBM. The belt-driven starter generator BSG has a first terminal connected to the positive poled of the main battery MB and of the auxiliary batter AB through the dual battery manager DBM.

The negative poles (−) of the main and auxiliary batteries MB and AB as well as the second terminals of the starter motor S and of the belt-driven starter generator BSG, are connected to the electrical ground of the motor vehicle MV.

Finally, the electrical loads L are connected to the positive pole of the auxiliary battery AB through an electrical energy distribution stage (not shown), thus being connected also to the positive pole of the main battery MB through the dual battery manager DBM.

The dual battery manager DBM has a first input/output terminal I/O-1 connected to the positive pole of the main battery MB, a second input/output terminal I/O-2 connected to the positive pole of the auxiliary battery AB, and a third input/output terminal I/O-3 connected to the first terminal of the belt-driven starter generator BGS.

The dual battery manager DBM comprises two electronically controllable switch devices SWMB and SWAB associated with the main battery MB and with the auxiliary battery AB, respectively, and manufactured by means of relays or solid-state devices. The dual battery manager DBM could also optionally comprise a properly programmed microcontroller.

The first switch device SWMB is connected in series to the first input/output terminal I/O-1, thus being connected to the positive pole of the main battery MB, whereas the second switch device SWAB is connected in series to the second input/output terminal I/O-2, thus being connected to the positive pole of the auxiliary battery AB. The second switch device SWAB could be a switch device distinct from the auxiliary battery AB or it could consist of a switch device built-in in the auxiliary battery AB.

The operation state (open or closed) of the switch devices SWMB and SWAB is controlled by the electronic control unit ECU either directly, when the dual battery manager DBM has no microcontroller, or through the microcontroller of the dual battery manager DBM, in both cases based on the information provided by the battery electric charge status sensor SEN and by the battery management system BMS and on status information of the motor vehicle MV provided through the automotive on-board network NET.

The electronic control unit ECU is further configured to carry out a diagnosis of the dual battery manager DBM aimed at identifying possible faults of the switch devices SWMB and SWAB and of the relative microcontroller, if present, and at implementing specific switching strategies of the switch devices SWMB e SWAB depending on the identified fault, said strategies being not described herein in detail as they are not part of the invention.

Finally, the electrical energy distribution stage can have different circuit architectures and, in one of them, it controls both safety critical electrical loads and the safety non-critical electrical loads, whereas, in the other one, it supplies power to the safety non-critical electrical loads through the sole main battery MB and to the safety critical electrical loads through one between the main battery MB and the auxiliary batter AB, depending on the operation status (open/close) of the switch devices SWMB and SWAB. This second architecture allows manufacturers to use a smaller auxiliary battery AB in terms of energy capacity and, hence, of dimensions, thus making it easier for it to be installed in the motor vehicles.

As to the distinction of the electrical loads, the safety critical electrical loads can comprise, by way of non-limiting example, the power steering, the braking system and the sub-systems associated with it, such as the ABS (Antilock Braking System) and the ESP (Electronic Stability Program), the lighting system, the windshield wipers, etc., whereas the safety non-critical electrical loads can comprise, by way of non-limiting example, the infotainment system comprising, among other things, the air conditioning system, etc.

In a different embodiment, which is not shown herein, the automotive dual battery electrical system could have the architecture described and shown in the aforesaid EP 2 390 982 A1 of the Applicant.

According to the invention, the electronic control unit ECU is configured to implement a logic for the management of the automotive dual battery electrical system DBES which allowed the Applicant to reach the goals set, namely further improving the efficiency in the management of the electrical energy flow of the dual battery electrical system DBES.

The management logic according to the invention is basically designed to manage the electrical energy flows in the dual battery electrical system DBES so as to favour the electrical balance of the motor vehicle MV, when needed, and, on the other hand, to minimize the fuel consumption of the motor vehicle MV, when possible.

The management logic according to the invention will be described hereinafter with reference to FIG. 3, which shows a table representing the so-called operation plane of the dual battery electrical system DBES, which represents all the electric charge statuses which can be assumed by the main and auxiliary batteries MB and AB as well as the electrical energy demands which can be made by the electrical loads L.

In particular, in the table shown in FIG. 3, the columns represent the status of charge (SOC) of the main battery MB, whereas the rows represent the status of charge (SOC) of the auxiliary batter AB, both expressed in percentage values relative to the maximum status of charge that can be reached by the main and auxiliary batteries MB and AB.

The status of charge of the main and auxiliary batteries MB and AB are grouped in a given number of electric charge ranges, each delimited, at the bottom and at the top, by a lower electric charge status threshold and by a higher electric charge status threshold and comprising the electric charge statuses comprised between the lower electric charge status threshold and the higher electric charge status threshold.

In the embodiment represented in the table shown in FIG. 3, the statuses of electric charge of the main and auxiliary batteries MB and AB are grouped in three electrical charge ranges comprising a lower electric charge range, a higher electric charge range and an intermediate electric charge range.

As far as the main battery is concerned MB, the lower electric charge range comprises the statuses of electric charge below 80%, the intermediate electric charge range comprises the statuses of electric charge comprised between 80% and 85%, and the higher electric charge range comprises the statuses of electric charge comprised between 85% and 100%.

As far as the auxiliary battery is concerned AB, the lower electric charge range comprises the statuses of electric charge below 30%, the intermediate electric charge range comprises the statuses of electric charge comprised between 30% and 50%, and the higher electric charge range comprises the statuses of electric charge comprised between 50% and 90%.

The percentage values of the electric charge status thresholds defining the different electric charge ranges at the top and at the bottom and indicated in the table of FIG. 3 are mere examples and depend on different factors which can change from manufacturer to manufacturer, among them there are the type of main and auxiliary batteries MB and AB and the logic for the management of the operation of the automotive dual battery electrical system DBES to be implemented by each manufacturer.

In a different embodiment, the statuses of electric charge of the main and auxiliary batteries MB and AB could be grouped in a different number of electric charge statuses, for example four or more, in which each electric charge range can be divided into two or more electric charge sub-ranges so as to increase the level of detail of the logic for the management of the operation of the dual battery electrical system DBES.

In the table shown in FIG. 3, furthermore, each electric charge range of the auxiliary battery AB is associated with a given number of electrical load ranges defined by corresponding sets of values of the electric current absorbed by the loads L.

In particular, in the table shown in FIG. 3, each electric charge range of the auxiliary battery AB is associated, by mere way of example, with three electrical load ranges comprising a lower range including values of absorbed electric current ranging from 0 to 20 A, an intermediate range including values of absorbed electric current ranging from 20 to 50 A, and a higher range including values of absorbed electric current ranging from 50 to 100 A.

Therefore, the cells of the table shown in FIG. 3 can be identified by three values comprising an electric charge range of the main battery MB, an electric charge range of the auxiliary batter AB, and an electrical energy demand range.

The cells in the table shown in FIG. 3 further indicate the operation statuses (open or closed) of the two switch devices SWMB and SWAB of the dual battery manager DBM, the operation status (electric motor or alternator) of the belt-driven starter generator BSG, the operation status (enabled or disabled) of the engine stop&start functionality, and the operation status (enabled or disabled) of the regenerative braking functionality.

Depending on the operation statuses of the belt-driven starter generator BSG and of the switch devices SWMB and SWAB as well as on the operation statuses of the engine start&stop and regenerative braking functionalities, one of or both the main and auxiliary batteries MB and AB can be electrically charged by the belt-driven starter generator BSG, when it operates as an electrical generator and the regenerative braking functionality is enabled, or when it operates as an alternator, and the internal combustion engine ICE can be restarted by the belt-driven starter generator BSG, when it operates as an electric motor and the engine start&stop functionality is enabled.

To this regard, in the table shown in FIG. 3, the cells are coloured with three different shades of grey, a light one, an intermediate one and a dark one, which identify, in the operation plane of the automotive dual battery electrical system DBES, three different operation areas, in which the automotive electronic control unit ECU is programmed to carry out different interventions on the automotive dual battery electrical system DBES in order to favour the electrical balance or minimize the energy consumption of the motor vehicle MV, as described in detail below.

On a quality level, when both the main and the auxiliary batteries MB and AB have reached a sufficient status of electric charge and the electrical energy demand of the loads L permits it, the automotive electronic control unit ECU is programmed to carry out all the interventions available to minimize the energy consumption of the motor vehicle MV (light grey cells). As one of or both the main and auxiliary batteries MB and AB run down below a given electric charge status, the automotive electronic control unit ECU is programmed to progressively reduce the interventions aimed at minimizing the electrical consumption of the motor vehicle MV in order to re-establish the correct electrical balance and avoid an excess discharge of one of or both the main and auxiliary batteries MB and AB (intermediate grey cells). Then, when the electrical energy demand of the loads L exceeds a given threshold or when one of or both the main and auxiliary batteries MB and AB have sufficiently run down, the automotive electronic control unit ECU is programmed to carry out interventions aimed at correctly re-establishing the electrical balance of the automotive dual battery electrical system DBES in order to ensure the correct operation of the motor vehicle MV (dark grey cells).

From a quantity point of view, the three reference operation areas in the operation plane of the automotive dual battery electrical system DBES comprise:
  a first operation area, which is identified by the cells with a white background and comprises or is defined by:
    electric charge statuses of the main and auxiliary batteries MB and AB belonging to the corresponding higher electric charge ranges, and electrical energy demands of the electrical loads L belonging to any electrical energy demand range, and
    electric charge statuses of the main battery MB belonging to the higher electric charge range, electric charge statuses of the auxiliary battery AB belonging to the intermediate electric charge range, and electrical energy demands of the electrical loads L belonging to either the lower or the intermediate electrical energy demand range;
  a second operation area, which is identified by the cells with a black background and comprises or is defined by:
    electric charge statuses of the main battery MB belonging to the lower electric charge range, electric charge statuses of the auxiliary battery AB belonging to any electric charge range, and electrical energy demands of the electrical loads L belonging to any electrical energy demand range, and electric charge statuses of the main battery MB belonging to either the higher or the intermediate electric charge range, electric charge statuses of the auxiliary battery AB belonging to the lower electric charge range, and electrical energy demands of the electrical loads L belonging to the higher electrical energy demand range; and a third operation area, which is an area of transition between the first and the second reference operation areas, is identified by the cells with a grey background, and comprises:

a first subarea, which is defined by:

electric charge statuses of the main battery MB belonging to the intermediate electric charge range, electric charge statuses of the auxiliary battery AB belonging to either the higher or the intermediate electric charge range, and electrical energy demands of the electrical loads L belonging to any electrical energy demand range, and electric charge statuses of main battery MB belonging to the higher electric charge range, electric charge statuses of the auxiliary battery AB belonging to the intermediate electric charge range, and electrical energy demands of the electrical loads L belonging to the higher electrical energy demand range;

a second subarea defined by electric charge statuses of main battery MB belonging to the higher range of electric charge, electric charge statuses of the auxiliary battery AB belonging to the lower electric charge range, and electrical energy demands of the electrical loads L belonging to either the lower or the intermediate electrical energy demand range; and a third subarea comprising electric charge statuses of the main battery MB belonging to the intermediate electric charge range, electric charge statuses of the auxiliary battery AB belonging to the lower electric charge range, and electrical energy demands of the loads L belonging to either the lower or the intermediate electrical energy demand range.

The automotive electronic control unit ECU is programmed to determine the operation area in which the automotive dual battery electrical system DBES operates and to carry out different interventions depending on the operation area in which the automotive dual battery electrical system DBES operates, in order to favour the electrical balance of the motor vehicle MV, when needed, and, on the other hand, minimize the energy consumption of the motor vehicle MV, when possible.

In order to determine the operation area in which the automotive dual battery electrical system DBES operates, the automotive electronic control unit ECU is programmed to determine, first of all, the current operation status of the automotive dual battery electrical system DBES, which is defined by the set of current electric charge statuses of the main and auxiliary batteries MB and AB and by the current electrical energy demand of the electrical loads L, and, thus, to determine which operation area the current operation status of the automotive dual battery electrical system DBES belongs to.

In particular, if the current operation status of the automotive dual battery electrical system DBES is determined to belong to the first operation area, the automotive electronic control unit ECU is programmed to carry out interventions that allow the fuel consumption of the motor vehicle MV to be minimized.

If the current operation status of the automotive dual battery electrical system DBES is determined to belong to the second operation area, the automotive electronic control unit ECU is programmed to carry out interventions aimed at re-establishing the electrical balance in order to ensure the correct operation of the motor vehicle MV.

If, on the other hand, the current operation status of the automotive dual battery electrical system DBES is determined to belong to the third operation area, the automotive electronic control unit ECU is programmed to progressively reduce the interventions carried out in the first operation area and aimed at minimizing the fuel consumption of the motor vehicle MV in order to re-establish the correct electrical balance and avoid an excess discharge of one of or both the main and the auxiliary batteries MB and AB.

In particular, in the first operation area, which corresponds to relatively high electric charge statuses of the main and auxiliary batteries MB and AB, the automotive electronic control unit ECU is programmed to:

open the switch device SWMB associated with the main battery MB, close the switch device SWAB associated with the auxiliary battery AB, enable the electric power assist EPA functionality, so as to cause the belt-driven starter generator BSG to operate, when needed, as an electric motor in order to generate a mechanical power to be added to the one generated by the internal combustion engine ICE, enable the regenerative braking RB functionality, so as to cause the belt-driven starter generator BSG to operate, when needed, as an electrical generator in order to recover part of the kinetic energy of the motor vehicle MV during braking, and enable the engine stop&start functionality, so as to cause the belt-driven starter generator BSG to operate, when needed, as an electric motor in order to restart the internal combustion engine ICE.

Therefore, in the first operation area, the main battery MB is electrically disconnected from the belt-driven starter generator BSG and supplies power to the electrical loads L, whereas the auxiliary battery AB is electrically connected to the belt-driven starter generator BSG and, together, they cooperate in the implementation of the engine power assist and regenerative braking RB functionalities.

In the first operation area, furthermore, the regenerative braking RB functionality electrically charges the sole auxiliary battery AB, as the main battery MB is electrically disconnected from the belt-driven starter generator BSG.

In the second operation area, which corresponds to relatively low electric charge statuses of the main battery MB, regardless of the electric charge status of the auxiliary battery AB, the automotive electronic control unit ECU is programmed to:

close the switch device SWMB associated with the main battery MB, open the switch device SWAB associated with the auxiliary battery AB, enable the alternator (A) functionality, so as to cause the belt-driven starter generator BSG to operate as a classic alternator, namely as an electrical generator, in order to generate electrical energy; and disable the engine stop&start functionality, so as to cause the belt-driven starter generator BSG not to operate as an electric motor for the restart of the internal combustion engine ICE.

Therefore, in the second operation area, the main battery MB is electrically connected to the belt-driven starter generator BSG and supplies power to the electrical loads L, whereas the auxiliary battery AB is electrically disconnected from the belt-driven starter generator BSG.

In the second operation area, furthermore, the belt-driven starter generator BSG electrically charges the sole main battery MB, as the auxiliary battery AB is electrically disconnected from the belt-driven starter generator BSG.

In the third operation area, the automotive electronic control unit ECU is programmed to intervene in a different manner on the automotive dual battery electrical system DBES depending on the subarea which the current operation status of the automotive dual battery electrical system DBES is determined to belong to.

In particular, in the first sub-area, the automotive electronic control unit ECU is programmed to:
close both the switch device SWMB associated with the main battery MB and the switch device SWAB associated with the auxiliary battery AB,
enable the regenerative braking RB functionality, but not the electric power assist EPA functionality, so as to cause the belt-driven starter generator BSG to operate, when needed, as an electrical generator in order to recover part of the kinetic energy of the motor vehicle MV during braking, and not to operate as an electric motor in order not to generate an additional mechanical power to be added to the one generated by the internal combustion engine ICE,
enable the engine stop&start functionality, so as to cause the belt-driven starter generator BSG to operate, when needed, as an electric motor in order to restart the internal combustion engine ICE.

Therefore, in the first subarea, both the main battery MB and the auxiliary batter AB are electrically connected to the belt-driven starter generator BSG and the electrical energy demands of the electrical loads L and of the belt-driven starter generator BSG during the restart of the internal combustion engine, after it has been temporarily stopped due to the engine start&stop, are fulfilled by both the main and the auxiliary batteries MB and AB, which are electrically charged during the braking of the motor vehicle MV thanks to the enabling of the regenerative braking.

In the second sub-area, the automotive electronic control unit ECU is programmed to:
open the switch device SWMB associated with the main battery MB,
close the switch device SWAB associated with the auxiliary battery AB,
enable the implementation of the regenerative braking RB functionality, but not the one of the electric power assist EPA functionality, so as to cause the belt-driven starter generator BSG to operate as an electrical generator in order to recover part of the kinetic energy of the motor vehicle MV during braking, and not to operate as an electric motor in order not to generate an additional mechanical power to be added to the one generated by the internal combustion engine ICE, and
disable the implementation of the engine stop&start functionality, so as to cause the belt-driven starter generator BSG not to operate as an electric motor for the restart of the internal combustion engine ICE.

Therefore, in the second subarea, the main battery MB is electrically disconnected from the belt-driven starter generator BSG and supplies power to the electrical loads L, whereas the auxiliary battery AB is electrically connected to the belt-driven starter generator BSG and, together, they cooperate in the implementation of the regenerative braking RB functionality.

In the third subarea, furthermore, the regenerative braking RB functionality electrically charges the sole auxiliary battery AB, as the main battery MB is electrically disconnected from the belt-driven starter generator BSG.

Finally, in the third sub-area, the automotive electronic control unit ECU is programmed to:
close the switch device SWMB associated with the main battery MB,
close the switch device SWAB associated with the auxiliary battery AB.
enable the implementation of the regenerative braking RB functionality, but not the one of the electric power assist EPA functionality, so as to cause the belt-driven starter generator BSG to operate as an electrical generator in order to recover part of the kinetic energy of the motor vehicle MV during braking, and not to operate as an electric motor in order not to generate an additional mechanical power to be added to the one generated by the internal combustion engine ICE, and
disable the implementation of the engine stop&start functionality, so as to cause the belt-driven starter generator BSG not to operate as an electric motor for the restart of the internal combustion engine ICE.

Therefore, in the third subarea, both the main battery MB and the auxiliary batter AB are electrically connected to the belt-driven starter generator BSG and the electrical energy demands of the electrical loads L are fulfilled by both the main and the auxiliary batteries MB and AB, which are electrically charged during the braking of the motor vehicle MV thanks to the enabling of the regenerative braking RB.

The logic for the management of the operation of the automotive dual battery electrical system according to the invention, as described above, allowed the Applicant to reach the goals set, namely further improving the efficiency in the management of the electrical energy flow in the automotive dual battery electrical system, favouring the electrical balance of the motor vehicle MV, when needed, and, on the other hand, minimizing the energy consumption of the motor vehicle MV, when possible.

The invention claimed is:

1. An apparatus for a motor vehicle, the motor vehicle including an internal combustion engine and a dual battery electrical system, the dual battery electrical system including a main electrical energy source, an auxiliary electrical energy source, electrical loads including electrically-powered and/or electrically-controlled devices on-board the motor vehicle, a belt starter-generator operatively coupled to the internal combustion engine and electronically controllable to selectively operate as an electric motor to generate a mechanical torque and as an electrical generator to generate electrical energy, and an electrical switch connected among the main and auxiliary electrical energy sources, the belt starter-generator, and the electrical loads, and electronically controllable to selectively connect the main and auxiliary electrical energy sources, the belt starter-generator and the electrical loads, the apparatus comprising:
an automotive electronic control unit configured to be connectable to the dual battery electrical system to control the belt starter-generator and the electrical switch to selectively perform one or more functionalities of a plurality of functionalities including
automatic internal combustion engine stop and start, in which the belt starter-generator is operated, when needed, as the electric motor to start the internal combustion engine after it has been stopped by the automotive electronic control unit in certain running conditions of the motor vehicle,
regenerative braking, in which the belt starter-generator is operated, when needed, as the electrical generator to recover kinetic energy of the motor vehicle during braking and transform it into electrical energy,
electric power assist, in which the belt starter-generator is operated, when needed, as the electric motor to generate mechanical torque to supplement a mechanical torque generated by the internal combustion engine, and
alternator, in which the belt starter-generator is operated as the electrical generator to generate electrical energy;
wherein an operation status of the dual battery electrical system is representable via an operation plane representative of electric charge statuses of the main electrical energy source and electric charge statuses of the auxiliary electrical energy source and of electrical energy demands that can be made by the electrical loads,
wherein the electric charge statuses of the main electrical energy source are grouped in corresponding electric charge ranges including
a lower main electric charge range that includes electric charge values of the main electrical energy source that range from a first main electric charge threshold value to a second main electric charge threshold value,
a higher main electric charge range that includes electric charge values of the main electrical energy source that range from a third main electric charge threshold value to a fourth main electric charge threshold value, and
an intermediate main electric charge range that includes electric charge values of the main electrical energy source that range from the second main electric charge threshold value to the third main electric charge threshold value,
wherein the electric charge statuses of the auxiliary electrical energy source are grouped in corresponding electric charge ranges including
a lower auxiliary electric charge range that includes electric charge values of the auxiliary electrical energy source that range from a first auxiliary electric charge threshold value to a second auxiliary electric charge threshold value,
a higher auxiliary electric charge range that includes electric charge values of the auxiliary electrical energy source that range from a third auxiliary electric charge threshold value to a fourth auxiliary electric charge threshold value, and
an intermediate auxiliary electric charge range that includes electric charge values of the auxiliary electrical energy source that range from the second auxiliary electric charge threshold value to the third auxiliary electric charge threshold value,
wherein the electrical energy demands of the electrical loads are grouped in electrical energy ranges including
a lower electrical energy demand range that includes electrical energy demands ranging from a first energy demand threshold value to a second energy demand threshold value,
a higher electrical energy demand range that includes electrical energy demands ranging from a third energy demand threshold value to a fourth energy demand threshold value, and
an intermediate electrical energy demand range that includes electrical energy demands ranging from the second energy demand threshold value to the third energy demand threshold value,
wherein the operation plane of the dual battery electrical system includes different operation areas including
a first operation area including
electric charge statuses of the main electrical energy source and the auxiliary electrical energy source belonging to the higher main electric charge range and the higher auxiliary charge range, respectively, and electrical energy demands of the electrical loads belonging to any electrical energy demand range, and
electric charge statuses of the main electrical energy source belonging to the higher main electric charge range, electric charge statuses of the auxiliary electrical energy source belonging to the intermediate auxiliary electric charge range, and electrical energy demands of the electrical loads belonging to either the lower electrical energy demand range or the intermediate electrical energy demand range,
a second operation area including
electric charge statuses main electrical source belonging to the lower main electric charge range, electric charge statuses of the auxiliary electrical energy source belonging to any electric charge range, and electrical energy demands of the electrical loads belonging to any electrical energy demand range, and
electric charge statuses of the main electrical energy source belonging to either the higher main electric charge range or the intermediate main electric charge range, electric charge statuses of the auxiliary energy source belonging to the lower auxiliary electric charge range, and electrical energy demands of the electrical loads belonging to the higher electrical energy demand range, and
a third operation area including
a first subarea including
electric charge statuses of the main electrical energy source belonging to the intermediate main electric charge range, electric charge statuses of the auxiliary electrical energy belonging to either the higher auxiliary electrical energy range or the intermediate auxiliary electrical charge range, and electrical energy demands of the electrical loads belonging to any electrical energy demand range, and
electric charge statuses of main electrical energy source belonging to the higher main electric charge range, electric charge statuses of the auxiliary electrical energy source belonging to the intermediate auxiliary electric charge range, and electrical energy demands of the electrical loads belonging to the higher electrical energy demand range, a second subarea including electric charge statuses of
the main electrical energy source belonging to the
higher main electric charge range, electric charge
statuses of the auxiliary electrical energy source
belonging to the lower auxiliary electric charge
range, and electrical energy demands of the electrical loads belonging to either the lower electrical
energy demand range or the intermediate electrical
energy demand range, and a third subarea including electric charge statuses of
the main electrical energy source belonging to the
intermediate main electric charge range, electric
charge statuses of the auxiliary electrical energy
source belonging to the lower auxiliary electric
charge range, and electrical energy demands of the
electrical loads belonging to either the lower electrical energy demand range or the intermediate
electrical energy demand range;

wherein the automotive electronic control unit is further
configured to determine a current operation status of the dual battery
electrical system defined by current electric charge
statuses of the main and auxiliary electrical energy
sources and by a current electrical energy demand of
the electrical loads, determine which operation area the current operation
status of the dual battery electrical system belongs
to, and control the operation of the dual battery electrical
system, and enable or disable implementation of one
or more of the functionalities of electric power assist,
regenerative braking, and automatic internal combustion engine stop and start depending on the
operation area which the current operation status of
the dual battery electrical system belongs to;

wherein the automotive electronic control unit is further
configured to when the current operation status of the dual battery
electrical system is determined to belong to the first
operation area, cause the electrical switch to electrically disconnect the main electrical energy source
from the belt starter-generator and to electrically
connect the auxiliary electrical energy source to the
belt starter-generator, and cause the functionalities of
electric power assist, regenerative braking and automatic internal combustion engine stop and start to be
enabled, when the current operation status of the dual battery
electrical system is determined to belong to the
second operation area, cause the electrical switch to
electrically connect the main electrical energy source
to the belt starter-generator and to electrically disconnect the auxiliary electrical energy source from
the belt starter-generator, cause the functionality of
alternator to be enabled, and cause the functionality
of automatic internal combustion engine stop and
start to be disabled, and when the current operation status of the dual battery
electrical system is determined to belong to the third
operation area, and depending on the electric charge
statuses of the main and auxiliary electrical energy
sources and on the electrical energy demand of the
electrical loads, implement one of causing the electrical switch to electrically connect
both the main electrical energy source and the
auxiliary electrical energy source to the belt
starter-generator, and causing the functionalities
of regenerative braking and automatic internal
combustion engine stop and start to be enabled, causing the electrical switch to electrically disconnect the main electrical energy source from the
belt starter-generator and to electrically connect
the auxiliary electrical energy source to the belt
starter-generator, causing the functionality of
regenerative braking to be enabled, and causing
the functionality of automatic internal combustion
engine stop and start to be disabled, or causing the electrical switch to electrically connect
both the main electrical energy source and the
auxiliary electrical energy source to the belt
starter-generator, causing the functionality of
regenerative braking to be enabled, and causing
the automatic internal combustion engine stop and
start to be disabled.

2. The apparatus of claim 1, wherein the automotive
electronic control unit is further configured to:

when the current operation status of the dual battery
electrical system is determined to belong to the first
subarea of the third operation area, cause the electrical
switch to electrically disconnect the main electrical
energy source and the auxiliary electrical energy source
to the belt starter-generator, and cause the functionalities of the regenerative braking and automatic internal
combustion engine stop and start to be enabled, when the current operation status of the dual battery
electrical system is determined to belong to the second
subarea of the third operation area, cause the electrical
switch to electrically disconnect the main electrical
energy source from the belt starter-generator and to
electrically connect the auxiliary electrical energy
source to the belt starter-generator, cause the functionality of regenerative braking to be enabled, and cause
the functionality of automatic internal combustion
engine stop and start to be disabled, and when the current operation status of the dual battery
electrical system is determined to belong to the third
subarea of the third operation area, cause the electrical
switch to electrically connect both the main electrical
energy source and the auxiliary electrical energy source
to the belt starter-generator, cause the functionality of
regenerative braking to be enabled, and cause the
functionality of automatic internal combustion engine
stop and start to be disabled.

3. The apparatus of claim 1, wherein
the first main electric charge threshold value is a 0%
charge status of the main electrical energy source,
the second main electric charge threshold value is an 80%
charge status of the main electrical energy source,
the third main electric charge threshold value is an 85%
charge status of the main electrical energy source,
the fourth main electric charge threshold value is a 100%
charge status of the main electrical energy source,
the first auxiliary electric charge threshold value is a 0%
charge status of the auxiliary electrical energy source,
the second auxiliary electric charge threshold value is a
30% charge status of the auxiliary electrical energy
source,
the third auxiliary electric charge threshold value is a 50%
charge status of the auxiliary electrical energy source,
the fourth auxiliary electric charge threshold value is a
90% charge status of the auxiliary electrical energy
source,
the first energy demand threshold value is a value of
absorbed electric current of 0 amp, the second energy demand threshold value is a value of absorbed electric current of 20 amp, the third energy demand threshold value is a value of absorbed electric current of 50 amp, and the fourth energy demand threshold value is a value of absorbed electric current of 100 amp.

4. A non-transitory computer-readable storage medium storing a program of instructions executable in an automotive electronic control unit to cause the automotive electronic control unit to become configured to determine a current operation status of a dual battery electrical system, determine which operation area the current operation status of the dual battery electrical system belongs to, and control an operation of the dual battery electrical system, and enable or disable implementation of one or more functionalities of electric power assist, regenerative braking, and automatic internal combustion engine stop and start as claimed in claim 1.

5. An automotive dual battery electrical system for a motor vehicle, the motor vehicle including an internal combustion engine, the automotive dual battery electrical system comprising:

a main electrical energy source;

an auxiliary electrical energy source;

electrical loads;

a belt starter-generator coupled to the internal combustion engine and electronically controllable to selectively operate as an electric motor to generate a mechanical torque and as an alternator to generate electrical energy;

an electrical switch connected among the main and auxiliary electrical energy sources, the belt starter-generator, and the electric loads, and electronically controllable to selectively connect the main and auxiliary electrical energy sources, the belt starter-generator and the electrical loads; and the automotive electronic unit of claim 1.

6. A motor vehicle comprising:

an internal combustion engine; and the dual battery electrical system of claim 5.

* * * * *